(12) United States Patent
Locke et al.

(10) Patent No.: US 11,315,114 B2
(45) Date of Patent: Apr. 26, 2022

(54) DYNAMIC TRANSACTION CARD PROTECTED BY MULTI-FACTOR AUTHENTICATION

(71) Applicant: Capital One Services, LLC, McLean, VA (US)

(72) Inventors: Tyler Locke, Washington, DC (US); Kevin P. Kelly, Austin, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 310 days.

(21) Appl. No.: 16/702,842

(22) Filed: Dec. 4, 2019

(65) Prior Publication Data

US 2021/0174363 A1    Jun. 10, 2021

Related U.S. Application Data

(63) Continuation of application No. 15/661,493, filed on Jul. 27, 2017, now Pat. No. 10,535,068.

(60) Provisional application No. 62/439,585, filed on Dec. 28, 2016.

(51) Int. Cl.
   *G06Q 20/40* (2012.01)
   *G06K 19/077* (2006.01)
   *G06Q 20/38* (2012.01)

(52) U.S. Cl.
   CPC ..... *G06Q 20/401* (2013.01); *G06K 19/07773* (2013.01); *G06Q 20/3829* (2013.01)

(58) Field of Classification Search
   None
   See application file for complete search history.

(56) References Cited

U.S. PATENT DOCUMENTS

| | | | |
|---|---|---|---|
| 5,590,038 A | 12/1996 | Pitroda | |
| 7,194,438 B2 | 3/2007 | Sovio et al. | |
| 9,516,010 B1 | 12/2016 | Avital et al. | |
| 9,949,065 B1 * | 4/2018 | Zarakas | H04W 12/04 |
| 10,101,990 B2 | 10/2018 | O'Connor et al. | |

(Continued)

FOREIGN PATENT DOCUMENTS

KR           725146 B1    6/2007

OTHER PUBLICATIONS

Office Action in related EP Application No. 17210982.9, dated Jan. 22, 2020.

*Primary Examiner* — Namrata Boveja
*Assistant Examiner* — Amit Patel
(74) *Attorney, Agent, or Firm* — Troutman Pepper Hamilton Sanders LLP; Christopher J. Forstner; John A. Morrissett (57) ABSTRACT

A dynamic transaction card comprising an outer surface, a sensor, and a display disposed on the outer surface is disclosed. The dynamic transaction card can include an antenna and a microcontroller controlling a dynamic transaction card application. The dynamic transaction card can also include a secure payment chip having a plurality of contact points and storing a passive tag associated with a user. The passive tag can include a unique identifier and one or more log-in credentials for the user. When making a purchase, the user can be authenticated via a connection between the dynamic transaction card and a user device. The unique identifier can be used as an authentication token and the one or more log-in credentials can be verified against log-in credentials associated with the user.

20 Claims, 4 Drawing Sheets

(56) References Cited

U.S. PATENT DOCUMENTS

| | | |
|---|---|---|
| 10,255,464 B2 | 4/2019 | Terra et al. |
| 10,318,952 B1 | 6/2019 | Wade et al. |
| 10,380,389 B1 | 8/2019 | Wade |
| 2004/0054632 A1 | 3/2004 | Remy |
| 2014/0081785 A1 | 3/2014 | Valadas |
| 2016/0306977 A1 | 10/2016 | Zarakas et al. |
| 2016/0309323 A1 | 10/2016 | Barakas et al. |
| 2017/0200144 A1 | 7/2017 | Chatterton |
| 2017/0228715 A1 | 8/2017 | Gurunathan |

\* cited by examiner

DYNAMIC TRANSACTION CARD PROTECTED BY MULTI-FACTOR AUTHENTICATION

CROSS REFERENCE TO RELATED APPLICATIONS

This application is a continuation of, and claims priority under 35 U.S.C. § 120 to, U.S. patent application Ser. No. 15/661,493, filed Jul. 27, 2017, now U.S. Pat. No. 10,535,068, which claims the benefit of U.S. Provisional Application No. 62/439,585, filed Dec. 28, 2016, the entire contents of which is fully incorporated herein by reference in their entirety.

FIELD OF THE DISCLOSURE

The present disclosure relates to a dynamic transaction card, and systems and methods relating to the dynamic transaction card. A dynamic transaction card and a user device application provide a secure method of facilitating multi-factor authentication by utilizing the dynamic transaction card as a physical token.

BACKGROUND

Current systems and methods for authenticating a customer include requesting sensitive data from the customer, such as an account number, a transaction card number, a social security number, a mother's maiden name, a password, and/or other personal data. Because certain information may be known by fraudsters, "something you know" authentication techniques force obscure questions such as "What is your grandfather's middle name?" Also, if customers forget the answers to certain questions such as "Who was your favorite teacher?" the customer could be locked out of its user experience after repeated failed attempts.

The knowledge-based authentication therefore is limited by the customer's ability to select, retain and reproduce obscure responses. Also, current malware and phishing attacks ae capable of acquiring such obscure information, including two-factor authentication responses when transmitted via a network. With increased travel and the nature of mobile devices, sensitive data may be requested via a telephone call in a public space thereby compromising the sensitive data when a customer responds orally via telephone. Current authentication processes therefore are not only burdensome for customers but also time-consuming and costly for companies providing customer service to these customers.

These and other drawbacks exist.

SUMMARY

Various embodiments of the present disclosure provide a dynamic transaction card, systems supporting a dynamic transaction card, and methods for operating a dynamic transaction card. Specifically, a dynamic transaction card may be paired with a user application executed on a user device card to facilitate multi-factor authentication of a user by utilizing the dynamic transaction card as a physical token.

As referred to herein, a dynamic transaction card may be understood to be an active transaction card that may include a number of accounts that may be activated and/or deactivated by an account holder and/or account provider, data storage that may be updated to reflect real-time and/or on-demand account and/or transaction data, and/or display components to display the updated account and/or transaction data. A dynamic transaction card may be understood to be activated (e.g., turned on) and/or deactivated (e.g., turned off) based on input received at the dynamic transaction card as described herein.

A dynamic transaction card may be a smart card, which may be utilized as a physical token to facilitate multi-factor authentication. The dynamic transaction card may include a secure memory chip, a microprocessor, and an application processor that may store a dynamic transaction card application. The dynamic transaction card application when executed may cause the dynamic transaction card to receive a request from a user device application executed on a user device to authenticate a user when the user has logged in to the user device application. Various communication technologies may be utilized to create a connection between the dynamic transaction card and the user device application which may include wireless connections, which may include NFC, Bluetooth or BLE connections, as well as physical connections, which may include utilizing an external portable connection device, which may include a Universal Serial Bus (USB) dongle to connect the dynamic transaction card to the user device on which the user device application is executed.

The dynamic transaction card may store validation information in a passive tag, such as a passive NFC tag, and this validation information may be received by the user device application, and may be utilized with the connection between the dynamic transaction card and the user device, as described herein, log in credentials of the user wherein the user has logged in to the user device application, and user information stored in a digital security delivery storage to authenticate the user. The digital security delivery storage may store information about the user, including characteristics of dynamic transaction card, the user device and login information for the user for the user device application.

As such, this unique pairing of the dynamic transaction card and user device application may automatically facilitate a secure multi-factor authentication by utilizing the dynamic transaction card as a physical token.

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which.

DETAILED DESCRIPTION

The entire contents of the following applications are incorporated herein by reference: U.S. Patent Publication No. 2016-0307189, entitled "System, Method and Apparatus for a Dynamic Transaction Card" filed Apr. 14, 2016, which claims the benefit of U.S. Provisional Application No.

62/147,568 filed Apr. 14, 2015 and U.S. Provisional Application No. 62/720,669 filed Dec. 22, 2015; U.S. Patent Publication No. 2016-0307089, entitled "System, Method, and Apparatus for a Dynamic Transaction Card" filed Apr. 14, 2016, which claims the benefit of U.S. Provisional Application No. 62/270,669 filed Dec. 22, 2015 and U.S. Provisional Application No. 62/147,568 filed Apr. 14, 2015; U.S. Patent Publication No. 2016-0308371 entitled "Dynamic Transaction Card Power Management" filed Apr. 14, 2016, which claims the benefit of U.S. Provisional Application No. 62/147,568 filed Apr. 14, 2015, U.S. Provisional Application No. 62/266,324 filed Dec. 11, 2015, U.S. Provisional Application No. 62/270,307 filed Dec. 21, 2015, and U.S. Provisional Application No. 62/305,599 filed Mar. 9, 2016; U.S. Patent Publication No. 2016-0189143, entitled "A System, Method, and Apparatus for Locating a Bluetooth Enabled Transaction Card, filed Dec. 22, 2015, which claims the benefit of U.S. Provisional Application No. 62/095,190, filed on Dec. 22, 2014; U.S. Pat. No. 9,105,025, entitled, Enhanced Near Field Communications Attachment filed on May 29, 2014, which claims the benefit of U.S. Provisional Application No. 61/570,275 filed on Dec. 13, 2011 and U.S. Provisional Application No. 61/547,910 filed on Oct. 17, 2011; U.S. Patent Publication No. 2015-0032635, entitled "System and Method for Exchanging Data with Smart Cards" filed Jul. 23, 2014, which claims the benefit of U.S. Provisional Application No. 61/857,443 filed on Jul. 23, 2013; U.S. Patent Publication No. 2016-0307081, entitled "Dynamic Transaction Card with EMV Interface and Method of Manufacturing" filed Apr. 14, 2016, which claims the benefit of U.S. Provisional Application No. 62/270,648 filed Dec. 22, 2015 and U.S. Provisional Application No. 62/147,568 filed Apr. 14, 2015; U.S. Patent Publication No. 2014-0279231, entitled "System and Method for Providing Third Party Payments with Non-Integrated Merchants" filed Mar. 12, 2014, which claims the benefit of U.S. Provisional Application No. 61/778,776 filed Mar. 13, 2015; U.S. Patent Publication No. 2015-0094026, entitled "System and Method for Automatically Authenticating a Caller" filed Sep. 9, 2014, which claims the benefit of U.S. Provisional Application No. 61/875,251 filed Sep. 9, 2013; U.S. patent application Ser. No. 15/297,453 entitled "System and Method for Automatically Authenticating a Caller" filed Oct. 19, 2016, which is a continuation and claims the benefit of U.S. Patent Publication No. 2015-0094026, which claims the benefit of U.S. Provisional Application No. 61/875,251; and U.S. Patent Publication No. 2016-0078430, entitled "System and Method for Digital Authentication" filed Aug. 17, 2015, which claims the benefit of U.S. Provisional Application No. 62/037,710 filed Aug. 15, 2014.

The following description is intended to convey a thorough understanding of the embodiments described by providing a number of specific example embodiments and details involving a dynamic transaction card and systems and methods for using a dynamic transaction card to facilitate multi-factor authentication of a dynamic transaction card and a user device application by utilizing the dynamic transaction card as a physical token.

It should be appreciated, however, that the present disclosure is not limited to these specific embodiments and details, which are examples only. It is further understood that one possessing ordinary skill in the art, in light of known systems and methods, would appreciate the use of the invention for its intended purposes and benefits in any number of alternative embodiments, depending on specific design and other needs. A card including a EuroPay-MasterCard-Visa (EMV) standard chip, one form of a secure payment chip, is used as an example of a dynamic transaction card. A dynamic transaction card may include any type of transaction card that includes a microcontroller-enabled card used in any type of transaction, including, for example, debit cards, credit cards, pre-paid cards, cards used in transportation systems, membership programs, loyalty programs, hotel systems, and the like. A dynamic transaction card may include enhanced features, including hardware, software, and firmware, beyond the traditional features of a magnetic stripe or EMV card. The use of "mobile device" in the examples throughout this application is only by way of example. Any type of device capable of communicating with a dynamic transaction card may also be used, including, for example, personal computers, tablets, gaming systems, televisions, or any other device capable of communicating with a dynamic transaction card.

According to the various embodiments of the present disclosure, a dynamic transaction card and systems and methods for using a dynamic transaction card are provided. Such embodiments may include, for example, a transaction card including various components to facilitate the notifications, alerts, and/or other output on a dynamic transaction card to an account holder associated with the dynamic transaction card. Notifications, alerts, and output may be provided in the form of LED lights and/or colors, LED lighting patterns, dot matrix displays, and/or the like, which as situated on and/or within a dynamic transaction card. Interactive elements of a dynamic transaction card may be activated, triggered, and/or made available via an input component on the dynamic transaction card. For example, a dynamic transaction card may include a capacitive touch sensor, a piezoelectric sensor, via load cells, and/or the like. These types of sensors may activate, trigger, and/or make available display and/or LED lighting information to alert and/or notify a dynamic transaction card holder.

In various embodiments, providing the alerts, notifications, and/or other output on a dynamic transaction card could be provided with the assistance of a network environment, such as a cellular or Internet network. For example, a mobile device may request and/or receive data indicative of notifications, alerts, and/or output to be displayed on a dynamic transaction card from a financial institution system via a network. A mobile device may then relay the data via a network (e.g., a short-range wireless communication network, NFC, Bluetooth, and/or the like) to the dynamic transaction card for storage and/or to activate, trigger, and/or output notifications and/or alerts.

Figure 1:
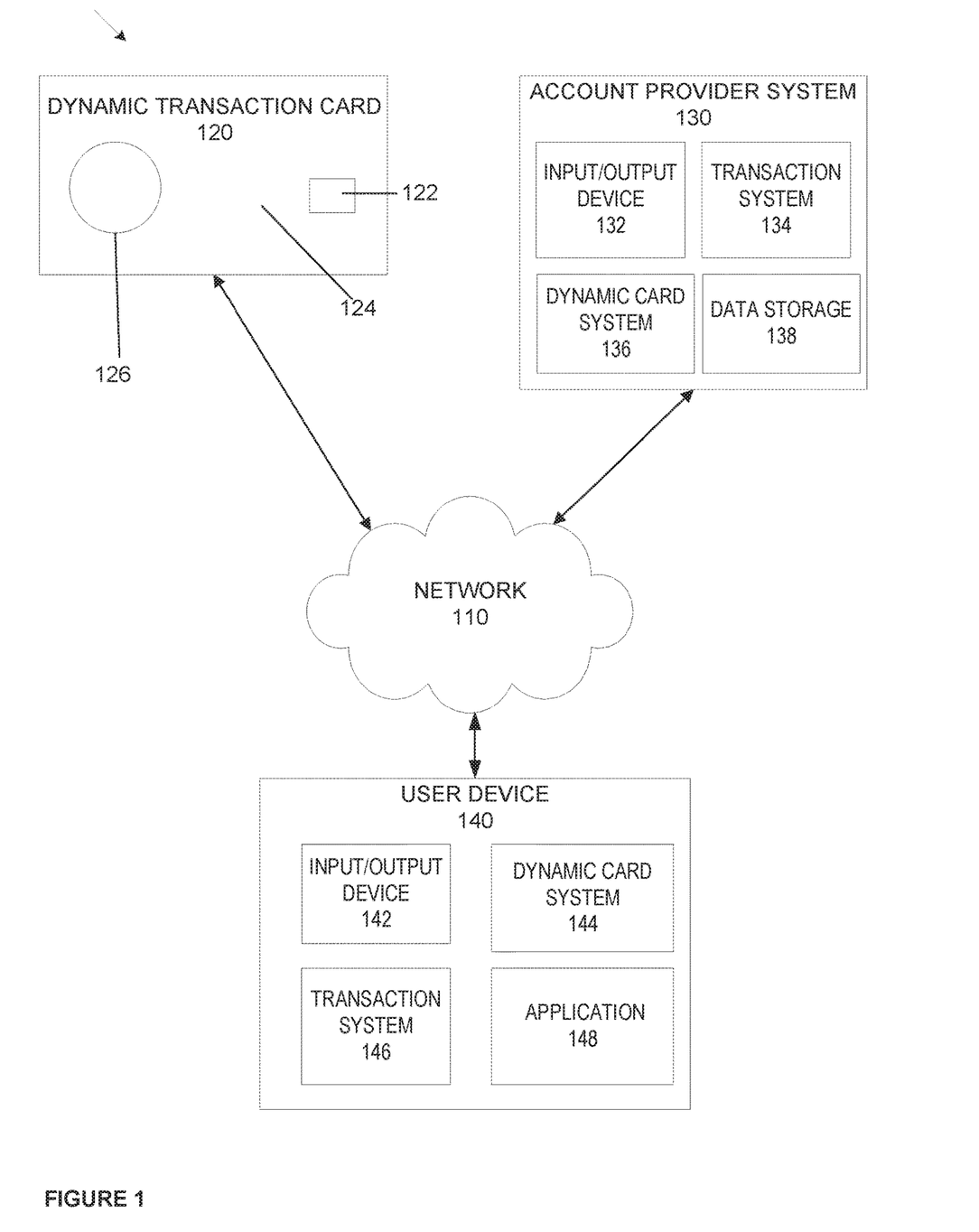
FIG. 1 depicts an example embodiment of a system including a dynamic transaction card according to embodiments of the disclosure.

FIG. 1 depicts an example system 100 including a dynamic transaction card, which may utilize a wireless connection in combination with a mobile application to facilitate a secure electronic checkout. As shown in FIG. 1, an example system 100 may include one or more dynamic transaction cards 120, one or more account provider systems 130, one or more user devices 140, and one or more merchant systems.

For example, network 110 may be one or more of a wireless network, a wired network or any combination of wireless network and wired network. For example, network 110 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MIMS), Enhanced Messaging Service (EMS), Short Message Service (SMS), Time Division Multiplexing (TDM) based systems, Code Division Multiple Access (CDMA) based systems, DAMPS, Wi-Fi, Fixed Wireless Data, IEEE 802.11b, 802.15.1, 802.11n and 802.11g, a Bluetooth network, or any other wired or wireless network for transmitting and receiving a data signal.

In addition, network 110 may include, without limitation, telephone lines, fiber optics, IEEE Ethernet 902.3, a wide area network ("WAN"), a local area network ("LAN"), a wireless personal area network ("WPAN"), or a global network such as the Internet. Also network 110 may support an Internet network, a wireless communication network, a cellular network, or the like, or any combination thereof. Network 110 may further include one network, or any number of the example types of networks mentioned above, operating as a stand-alone network or in cooperation with each other. Network 110 may utilize one or more protocols of one or more network elements to which they are communicatively coupled. Network 110 may translate to or from other protocols to one or more protocols of network devices. Although network 110 is depicted as a single network, it should be appreciated that according to one or more embodiments, network 110 may comprise a plurality of interconnected networks, such as, for example, the Internet, a service provider's network, a cable television network, corporate networks, and home networks.

User device 140 may be, for example, a mobile device, such as, for example, personal digital assistants (PDA), tablet computers and/or electronic readers (e.g., iPad, Kindle Fire, Playbook, Touchpad, etc.), wearable devices (e.g., Google Glass), laptop and/or desktop computers, telephony devices, smartphones, cameras, music playing devices (e.g., iPod, etc.), televisions, set-top-box devices, and the like.

Account provider system 130 and user device 140 also may include a network-enabled computer system and/or device. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The network-enabled computer systems may execute one or more software applications to, for example, receive data as input from an entity accessing the network-enabled computer system, process received data, transmit data over a network, and receive data over a network. For example, account provider system may include components such as those illustrated in FIG. 2.

Account provider system 130 and user device 140 may include at least one central processing unit (CPU), which may be configured to execute computer program instructions to perform various processes and methods. Account provider system 130 and user device 140, may include data storage, including for example, random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include an all flash array, a hybrid array, or a server-side product, enterprise storage, which may include online or cloud storage, or any other storage mechanism.

Account provider system 130 and user device 140 may further include, for example, a processor, which may be several processors, a single processor, or a single device having multiple processors. Although depicted as single elements, it should be appreciated that according to one or more embodiments, account provider system 130 and/or user device 140, may comprise a plurality of account provider systems 130 and/or user devices.

Account provider system 130 and user device 140 may further include data storage, such as data storage 138. The data storage may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include an all flash array, a hybrid array, or a server-side product, enterprise storage, which may include online or cloud storage or any other storage mechanism.

As shown in FIG. 1, each account provider system 130 and user device 140 may include various components. As used herein, the term "component" may be understood to refer to computer executable software, firmware, hardware, and/or various combinations thereof. It is noted there where a component is a software and/or firmware component, the component is configured to affect the hardware elements of an associated system. It is further noted that the components shown and described herein are intended as examples. The components may be combined, integrated, separated, or duplicated to support various applications. Also, a function described herein as being performed at a particular component may be performed at one or more other components and by one or more other devices instead of or in addition to the function performed at the particular component. Further, the components may be implemented across multiple devices or other components local or remote to one another. Additionally, the components may be moved from one device and added to another device or may be included in both devices.

As depicted in FIG. 1, system 100 may include dynamic transaction card 120. A dynamic transaction card may include any transaction card that is able to display alerts, notifications, and/or other output to a card holder via a display and/or LED lighting 126 and/or receive input to interact with the dynamic transaction card via, for example, a sensor 124. Although FIG. 1 depicts a single sensor, 124, multiple sensors may be included in dynamic transaction card 120. Dynamic transaction card 120 also may be composed of various materials that enable the entire exterior surface of card 120 to act as a sensor. A dynamic transaction card may be able to communicate with, for example, a mobile device using RFID, Bluetooth, NFC, Wi-Fi Direct and/or other related technologies. For example, communications between a dynamic transaction card and a mobile device may include methods, systems, and devices described in U.S. patent application Ser. No. 14/338,423 filed on Jul. 23, 2014, the entire contents of which are incorporated herein by reference.

A dynamic transaction card may be able to communicate with EMV terminals via contact points positions on the exterior of card 120 such as those positions on a secure payment chip, which may be an EMV chip 122 located on the dynamic transaction card 120 or an EMV plate positions on the exterior of card 120 connected to an EMV processor within card 120. For example, contact points position on the exterior of card 120 may be directly connected and adjacent to a secure payment processor, which may be an EMV processor (e.g., secure payment chip 122, which may be an EMV chip). In another example, the contact points positions on the exterior of card 120 may be connected to an secure payment processor, which may be an EMV processor sing a form of wired connection (e.g., electrical wiring, plastic jumpers, and/or the like) such that the secure payment processor, which may be an EMV processor may be positioned at any location in the interior of card 120 as described in U.S. Provisional Application 62/270,648, the entire contents of which are incorporated herein by reference.

A dynamic transaction card 120 may also include hardware components to provide contactless payments and/or communications. For example, dynamic transaction card 120 may include an output layer, an outer protective layer, potting, applications (e.g., a Java Applet), application integration (e.g., Java Applet integration), a secure payment chip 122, which may be an EMV chip, one or more sensors, a display, a display driver, firmware, a bootloader, a microcontroller, one or more antenna, an energy storage component, power management, a flexible PCB, a chassis, and/or card backing. A secure payment chip 122, which may be an EMV chip, embedded in the dynamic transaction card 120 may include a number of contacts that may be connected and activated using an interface device.

Account provider system 130 may include systems associated with, for example, a banking service company such as Capital One®, Bank of America®, Citibank®, Wells Fargo®, Sun Trust, various community banks, and the like, as well as a number of other financial institutions such as Visa®, MasterCard®, and American Express® that issue credit and/or debit cards, for example, as transaction cards. Account provider system 130 may include and/or be connected to one or more computer systems and networks to process transactions. For example, account provider system 130 may process transactions as shown and described in FIG. 5 below. Account provider system 130 may include systems associated with financial institutions that issue transaction cards, such as a dynamic transaction card 120, and maintains a contract with cardholders for repayment. In various embodiments, an account provider system 130 may issue credit, debit, and/or stored value cards, for example. Account provider system 130 may include, by way of example and not limitation, depository institutions (e.g., banks, credit unions, building societies, trust companies, mortgage loan companies, pre-paid gift cards or credit cards, etc.), contractual institutions (e.g., insurance companies, pension funds, mutual funds, etc.), investment institutions (e.g., investment banks, underwriters, brokerage funds, etc.), and other non-bank financial institutions (e.g., pawn shops or brokers, cashier's check issuers, insurance firms, check-cashing locations, payday lending, currency exchanges, microloan organizations, crowd-funding or crowd-sourcing entities, third-party payment processors, etc.).

Account provider system 130 may include an input/output device 132, a transaction system 134, a dynamic transaction card system 136, and data storage 138. Input/output device 132 may include for example, I/O devices, which may be configured to provide input and/or output to providing party system 130 (e.g., keyboard, mouse, display, speakers, printers, modems, network cards, etc.). Input/output device 132 also may include antennas, network interfaces that may provide or enable wireless and/or wire line digital and/or analog interface to one or more networks, such as network 110, over one or more network connections, a power source that provides an appropriate alternating current (AC) or direct current (DC) to power one or more components of account provider system 130, and a bus that allows communication among the various components of account provider system 130. Input/output device 132 may include a display, which may include for example output devices, such as a printer, display screen (e.g., monitor, television, and the like), speakers, projector, and the like. Although not shown, each account provider system 130 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like.

Transaction system 134 may include various hardware and software components to communicate between a merchant, acquisition system, account provider system, and/or a user device to process a transaction, such as a user purchase. Dynamic transaction card system 136 may include various hardware and software components, such as data storage (not shown) to store data associated with a dynamic transaction card (e.g., card number, account type, account balance, account limits, budget data, recent transactions, pairing data such as time and date of pairing with a mobile device, and the like) and cardholder data (e.g., cardholder name, address, phone number(s), email address, demographic data, and the like). Data storage 138 may store data associated with an account (e.g., card number, account type, account balance, account limits, budget data, recent transactions, pairing data such as time, date, and location of pairing with a mobile device, and the like) and account holder data (e.g., account holder name, address, phone number(s), email address, demographic data, and the like).

A user device 140, may be a mobile device, and may be any device capable of communicating with a transaction card 120 via, for example, short range wireless technology, such as Bluetooth technology, NFC technology, Wi-Fi Direct technology, and/or the like and execute various functions to transmit and receive account data (e.g., card number, account type, account balance, account limits, budget data, recent transactions, and/or the like) associated with dynamic transaction card 120. For example, user device 140 could be an iPhone, iPod, iPad, and/or Apple Watch from Apple® or any other mobile device running Apple's iOS operating system, any device running Google's Android® operating system, including, for example, smartphones running the Android® operating system and other wearable mobile devices, such as Google Glass or Samsung Galaxy Gear Smartwatch, any device running Microsoft's Windows® Mobile operating system, and/or any other smartphone or like device.

A user device 140 may also be a network-enabled computer. As referred to herein, a network-enabled computer may be, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device.

User device 140 may include for example, an input/output device 142, a dynamic card system 144, a transaction system 146, and an application 148. Input/output device 142 may include, for example, a Bluetooth device or chipset with a Bluetooth transceiver, a chip, and an antenna. The transceiver may transmit and receive information via the antenna and an interface. The chip may include a microprocessor that stores and processes information specific to a dynamic transaction device and provides device control functionality. Device control functionality may include connection creation, frequency-hopping sequence selection and timing, power control, security control, polling, packet processing, and the like. The device control functionality and other Bluetooth-related functionality may be supported using a Bluetooth API provided by the platform associated with the user device 140 (e.g., The Android platform, the iOS platform). Using a Bluetooth API, an application stored on a user device 140 (e.g., a banking application, a financial account application, etc.) or the device may be able to scan for other Bluetooth devices (e.g., a dynamic transaction card 120), query the local Bluetooth adapter for paired Bluetooth devices, establish RFCOMM channels, connect to other devices through service discovery, transfer data to and from other devices or a transaction card 120, and manage multiple connections. A Bluetooth API used in the methods, systems, and devices described herein may include an API for Bluetooth Low Energy (BLE) to provide significantly lower power consumption and allow a user device 140 to communicate with BLE devices that have low power requirements, such dynamic transaction card 120.

Input/output device 142 may include for example, I/O devices, which may be configured to provide input and/or output to user device 140 (e.g., keyboard, mouse, display, speakers, printers, modems, network cards, etc.). Input/output device 142 also may include antennas, network interfaces that may provide or enable wireless and/or wire line digital and/or analog interface to one or more networks, such as network 110, over one or more network connections, a power source that provides an appropriate alternating current (AC) or direct current (DC) to power one or more components of user device 140, and a bus that allows communication among the various components of user device 140. Input/output device 142 may include a display, which may include for example output devices, such as a printer, display screen (e.g., monitor, television, and the like), speakers, projector, and the like. Although not shown, each user device 140 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like.

Input/output device 142 may also include an NFC antenna and secure element (SE). The SE may be a hardware chip specially designed to be tamper proof. In one embodiment, the SE may be used for digitally and physically secure storage of sensitive data, including transaction card data, payment data, health records, car key identifiers, etc. The SE may, for example, store information related to a person, customer, financial institution, or other entity. The SE may store information related to a financial account, such as, for example, transaction card data (e.g., a credit card number, debit account number, or other account identifier, account balance, transaction history, account limits, budget data, recent transactions, and/or the like). The SE may include a computer processor or other computational hardware or software. As one example, the secure element may contain the Visa® and MasterCard® applications for PayWave® and PayPass® transactions. A secure element may take the form of a universal integrated circuit card (UICC) and/or a microSD card. A UICC may identify a user to a wireless operator, store contacts, enable secure connections, and add new applications and services, such as a transaction system.

Input/output device 142 may enable Industry Standard NFC Payment Transmission. For example, the input/output device 142 may enable two loop antennas to form an air-core transformer when placed near one another by using magnetic induction. Input/output device 142 may operate at 13.56 MHz or any other acceptable frequency. Also, input/output device 142 may provide for a passive communication mode, where the initiator device provides a carrier field, permitting answers by the target device via modulation of existing fields. Additionally, input/output device 142 also may provide for an active communication mode by allowing alternate field generation by the initiator and target devices.

Input/output device 142 may deactivate the RF field while awaiting data. The attachment may use Miller-type coding with varying modulations, including 100% modulation. The attachment may also use Manchester coding with varying modulations, including a modulation ratio of 10%. Additionally, the attachment may be capable of receiving and transmitting data at the same time, as well as checking for potential collisions when the transmitted signal and received signal frequencies differ.

Input/output device 142 may be capable of utilizing standardized transmission protocols, for example but not by way of limitation, ISO/IEC 14443 A/B, ISO/IEC 18092, MiFare, FeliCa, tag/smartcard emulation, and the like. Also, input/output device 142 may be able to utilize transmission protocols and methods that are developed in the future using other frequencies or modes of transmission. Input/output device 142 may also be backwards-compatible with existing techniques, for example RFID. Also, the system may support transmission requirements to meet new and evolving standards including internet-based transmission triggered by NFC.

Dynamic transaction card system 144 may work with input/output device 142 to generate and receive account data associated with a dynamic transaction card 120. For example, dynamic transaction card system may include various hardware and software components such as a processor and data storage to store dynamic transaction card data (e.g., cardholder name, address, phone number(s), email address, demographic data, card number, account type, account balance, account limits, budget data, recent transactions and the like).

Transaction system 146 may include various hardware and software components, such as data storage and a processor that may work with input/output device 142 to communicate between a merchant, acquisition system, account provider system, and/or a mobile device to process a transaction, such as a user purchase.

User device 140 may also include various software components to facilitate the operation of a dynamic transaction card 120. For example, user device 140 may include an operating system such as, for example, the iOS operating system from Apple, the Google Android operating system, and the Windows Mobile operating system from Microsoft. Mobile device 140 may also include, without limitation, software applications such as mobile banking applications and financial institution application to facilitate use of a dynamic transaction card 120, 150, an NFC application programming interface, and software to enable touch sensitive displays. Mobile banking applications and/or financial institution applications may be combined and/or separate from a dynamic transaction card system 144. Mobile device manufacturers may provide software stacks or Application Programming Interfaces (APIs) which allow software applications to be written on top of the software stacks. For example, mobile device manufacturers may provide, without limitation, a card emulation API to enable NFC card emulation mode, a logic link control protocol (LLCP) API for peer-to-peer communication between mobile devices, a Bluetooth API supporting BLE, and a real-time data (RTD) API and an NFC Data Exchange Format (NDEF) API for reading/writing.

Software applications on user device 140 may include, for example, user application 148, which may be integrated with or separate from a mobile wallet application, which may be utilized to by a customer to facilitate a secure electronic checkout. A user device 120 may communicate with account provider system 130 via mobile application 148.

Software applications on user device 140, such as mobile banking applications and applications associated with a dynamic transaction card 120, may include card on/off features that allow a cardholder associated with a mobile device 140 to enable and disable a transaction card. For example, a card holder may use, for example, a mobile banking application stored on a user device 140 to disable and/or enable accounts associated with a dynamic transaction card 120. A mobile banking application may include, for example, an application as displayed on mobile device 320 in FIG. 3. In this example, a dynamic transaction card 120 may have account data pre-stored on the dynamic transaction card 120 to associate a number of different accounts with the dynamic transaction card (e.g., debit card, credit card, prepaid card, and/or the like). If a card holder has a credit account established and desires to establish a debit card associated with the dynamic transaction card 120, the card holder may use a mobile device 140 and/or dynamic transaction card 120 to activate the inactive debit account on the dynamic transaction card 120.

Dynamic transaction card 120 may include firmware and/or a bootloader. A bootloader may include code to be executed as a dynamic transaction card is activated and before any operating system, firmware, or other code is executed on the dynamic transaction card 120. A bootloader may be activated via a sensor and energy storage component of the dynamic transaction card 120. A bootloader may be activated and/or load an application and/or program upon detection that card 120 has been inserted into a terminal, charger, and/or the like. A bootloader may be activated using only one technique described herein, using multiple techniques described herein, and/or using a card holder or card provider selected technique(s) described herein. A bootloader may only be active during a short interval after the card powers up. Dynamic transaction card 120 may also be activated using program code that may be flashed directly to a microprocessor such as a microcontroller, a secure payment processor, which may be an EMV processor, and/or the like. Dynamic transaction card 120 may not use a bootloader but instead may cycle between a sleep state and an active state using program code and/or memory.

A dynamic transaction card 120 may include a microcontroller and an antenna. An antenna may include, for example, a loop antenna, a fractal antenna, and/or the like. An antenna may transmit to and receive signals from a mobile device, such as user device 140, to conduct transactions and display data as described throughout the specification. A microcontroller may communicate with a secure payment chip, which may be an EMV chip, Java Applet, Java Applet integration, sensor(s), power management, antenna, energy storage component, display, display driver, firmware, bootloader, and/or any other component of dynamic transaction card 120. A microcontroller may control the card operations to conduct transactions and/or display data as described throughout this specification.

Figure 2:
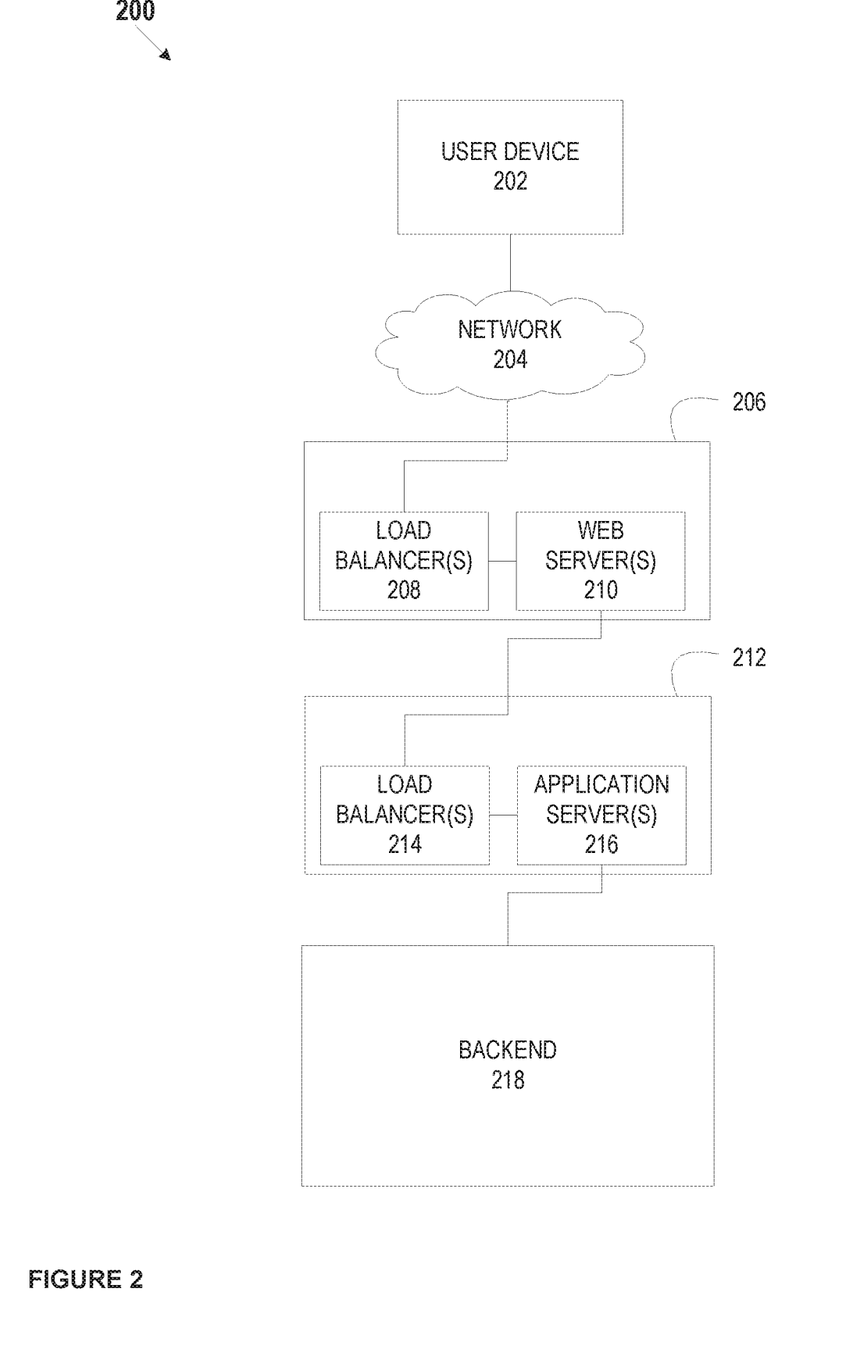
FIG. 2 depicts an example embodiment of a system including dynamic transaction card according to embodiments of the disclosure.

FIG. 2 illustrates a system associated with the use of a dynamic transaction card. The example system 200 in FIG. 2 may enable a financial institution, for example, to provide network services to its cardholders, and may include providing transaction card data, account data, and/or any other data to a mobile device that may in turn provide that data to a dynamic transaction card. For example, a financial institution may include a front-end controlled domain 206, a back-end controlled domain 212, and a backend 218 as part of account provider system 130, a user device 202 may include user device 140, and a dynamic transaction card may include dynamic transaction card 120.

The example system 200 also may enable a merchant, for example, to provide network services to its customers, and may include providing sales, loyalty account data, and/or any other data to a mobile device that may in turn provide that data to a dynamic transaction card. For example, a mobile device 202 and/or dynamic transaction card may interact with a merchant system, such as merchant system to send and/or receive data to the merchant system, which may interact with a financial institution over a network, where a financial institution may include a front-end controlled domain 206, a back-end controlled domain 212, and a backend 218.

System 200 may include a user device 202, a network 204, a front-end controlled domain 206, a back-end controlled domain 212, and a backend 218. Front-end controlled domain 206 may include one or more load balancers 208 and one or more web servers 210. Back-end controlled domain 212 may include one or more load balancers 214 and one or more application servers 216.

User device 202 may be a network-enabled computer. As referred to herein, a network-enabled computer may be, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 200 may execute one or more software applications to enable, for example, network communications.

User device 202 may be a mobile device, and may further be an iPhone, iPod, iPad from Apple® or any other mobile device running Apple's iOS operating system, any device running Google's Android® operating system, including for example, Google's wearable device, Google Glass, any device running Microsoft's Windows® Mobile operating system, and/or any other smartphone or like wearable mobile device. User device 202 also may be similar to user device 140 as shown and described in FIG. 1.

Network 204 may be one or more of a wireless network, a wired network, or any combination of a wireless network and a wired network. For example, network 204 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 204 may include, without limitation, telephone lines, fiber optics, IEEE Ethernet 902.3, a wide area network (WAN), a local area network (LAN) or a global network such as the Internet. Also, network 204 may support an Internet network, a wireless communication network, a cellular network, or the like, or any combination thereof. Network 204 may further include one network, or any number of example types of networks mentioned above, operating as a stand-alone network or in cooperation with each other. Network 204 may utilize one or more protocols of one or more network elements to which they are communicatively couples. Network 204 may translate to or from other protocols to one or more protocols of network devices. Although network 204 is depicted as a single network, it should be appreciated that according to one or more embodiments, network 204 may comprise a plurality of interconnected networks, such as, for example, the Internet, a service provider's network, a cable television network, corporate networks, and home networks.

Front-end controlled domain 206 may be implemented to provide security for backend 218. Load balancer(s) 208 may distribute workloads across multiple computing resources, such as, for example computers, a computer cluster, network links, central processing units or disk drives. In various embodiments, load balancer(s) 210 may distribute workloads across, for example, web server(s) 216 and/or backend 218 systems. Load balancing aims to optimize resource use, maximize throughput, minimize response time, and avoid overload of any one of the resources. Using multiple components with load balancing instead of a single component may increase reliability through redundancy. Load balancing is usually provided by dedicated software or hardware, such as a multilayer switch or a Domain Name System (DNS) server process.

Load balancer(s) 208 may include software that monitoring the port where external clients, such as, for example, user device 202, connect to access various services of a financial institution, for example. Load balancer(s) 208 may forward requests to one of the application servers 216 and/or backend 218 servers, which may then reply to load balancer 208. This may allow load balancer(s) 208 to reply to mobile device 202 without mobile device 202 ever knowing about the internal separation of functions. It also may prevent mobile devices from contacting backend servers directly, which may have security benefits by hiding the structure of the internal network and preventing attacks on backend 218 or unrelated services running on other ports, for example.

A variety of scheduling algorithms may be used by load balancer(s) 208 to determine which backend server to send a request to. Simple algorithms may include, for example, random choice or round robin. Load balancers 208 also may account for additional factors, such as a server's reported load, recent response times, up/down status (determined by a monitoring poll of some kind), number of active connections, geographic location, capabilities, or how much traffic it has recently been assigned.

Load balancers 208 may be implemented in hardware and/or software. Load balancer(s) 208 may implement numerous features, including, without limitation: asymmetric loading; Priority activation: SSL Offload and Acceleration; Distributed Denial of Service (DDoS) attack protection; HTTP/HTTPS compression; TCP offloading; TCP buffering; direct server return; health checking; HTTP/HTTPS caching; content filtering; HTTP/HTTPS security; priority queuing; rate shaping; content-aware switching; client authentication; programmatic traffic manipulation; firewall; intrusion prevention systems.

Web server(s) 210 may include hardware (e.g., one or more computers) and/or software (e.g., one or more applications) that deliver web content that can be accessed by, for example a client device (e.g., user device 202) through a network (e.g., network 204), such as the Internet. In various examples, web servers, may deliver web pages, relating to, for example, online banking applications and the like, to clients (e.g., user device 202). Web server(s) 210 may use, for example, a hypertext transfer protocol (HTTP/HTTPS or sHTTP) to communicate with mobile device 302. The web pages delivered to client device may include, for example, HTML documents, which may include images, style sheets and scripts in addition to text content.

A user agent, such as, for example, a web browser, web crawler, or native mobile application, may initiate communication by making a request for a specific resource using HTTP/HTTPS and web server 210 may respond with the content of that resource or an error message if unable to do so. The resource may be, for example a file on stored on backend 218. Web server(s) 210 also may enable or facilitate receiving content from mobile device 302 so mobile device 202 may be able to, for example, submit web forms, including uploading of files.

Web server(s) also may support server-side scripting using, for example, Active Server Pages (ASP), PHP, or other scripting languages. Accordingly, the behavior of web server(s) 210 can be scripted in separate files, while the actual server software remains unchanged.

Load balancers 214 may be similar to load balancers 208 as described above.

Application server(s) 216 may include hardware and/or software that is dedicated to the efficient execution of procedures (e.g., programs, routines, scripts) for supporting its applied applications. Application server(s) 216 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Also, application server(s) 216 may act as a set of components accessible to, for example, a financial institution, or other entity implementing system 200, through an API defined by the platform itself. For Web applications, these components may be performed in, for example, the same running environment as web server(s) 210, and application servers 216 may support the construction of dynamic pages. Application server(s) 216 also may implement services, such as, for example, clustering, fail-over, and load-balancing. In various embodiments, where application server(s) 216 are Java application servers, the web server(s) 216 may behaves like an extended virtual machine for running applications, transparently handling connections to databases associated with backend 218 on one side, and, connections to the Web client (e.g., user device 202) on the other.

Backend 218 may include hardware and/or software that enables the backend services of, for example, a financial institution, merchant, or other entity that maintains a distributed system similar to system 200. For example, backend 218 may include, a system of record, online banking applications, a rewards platform, a payments platform, a lending platform, including the various services associated with, for example, auto and home lending platforms, a statement processing platform, one or more platforms that provide mobile services, one or more platforms that provide online services, a card provisioning platform, a general ledger system, and/or a location system, which may include additional capabilities, such as transaction card data generation, transaction processing, and/or transmission of account and/or transaction data. Backend 218 may be associated with various databases, including account databases that maintain, for example, cardholder information (e.g., demographic data, credit data, cardholder profile data, and the like), transaction card databases that maintain transaction card data (e.g., transaction history, account balance, spending limit, budget categories, budget spending, budget limits, and the like), and the like. Backend 218 also may be associated with one or more servers that enable the various services provided by system 200. Backend 218 may enable a financial institution to implement various functions associated with reprogramming a transaction card and/or providing data to a transaction card in order to provide a dynamic display as shown and described herein.

A dynamic display may be a display that is altered by activating new card data such as, a new card number, a new security code (e.g., CCV code), a new expiration date, and/or other card/account data. A dynamic display may be a display that is altered by activating new account data, such as a new account number, a new card number, a new security code, a new expiration date, and/or other card/account data. New account and/or new card data may be fully pre-loaded, partially pre-loaded, and/or received from a wireless connection.

For example, fully pre-loaded data may include a full account number, card number, security code, expiration date, and/or other account data that is loaded onto a dynamic transaction card (e.g., dynamic transaction card 120) upon personalization at a backend facility. Fully pre-loaded data may also include an associated applet that interacts with the account and/or card data to execute transactions, manipulate dynamic displays, and/or perform any of the functionality described herein. Fully pre-loaded data may be activated upon receiving an activation signal from, for example, an account holder device via a wireless connection. A wireless device may receive an activation signal from an issuing financial institution via a network connection using, for example, a mobile application and/or mobile-enhanced website associated with the issuing financial institution.

Partially pre-loaded data may include a shell account that includes a placeholder for each type of data required for a fully-functional account (e.g., account holder data, account number, security code, expiration date, and/or the like). A placeholder may include one or more alphanumeric characters associated with inactive, null, or shell accounts in a backend system associated with the issuing financial institution. Partially pre-loaded data may include an associated applet that interacts with the account and/or card data to execute transactions, manipulate dynamic displays, and/or perform any of the functionality described herein. Partially pre-loaded data may be activated upon receiving an activation signal and/or new card or new account data from, for example, an account holder device via a wireless connection or a contact connection (e.g., using a terminal in contact with an EMV processor and/or another microchip). A wireless device may receive an activation signal and/or new card or new account data from an issuing financial institution via a network connection using, for example, a mobile application and/or mobile-enhanced website associated with the issuing financial institution.

Data transmitted may be encrypted. Encryption/decryption may occur using a key that was preloaded onto the dynamic transaction card upon personalization at the issuing financial institution and/or a key preloaded to a secure payment processing circuit, which may be an EMV circuit. Data received may include new account and/or card data. For example, where partially pre-loaded card and/or account data are stored on a dynamic transaction card, new card and/or account data may be received from an account holder's mobile device via a wireless connection (e.g., BLE, NFC, Wi-Fi, and/or the like) or a contact connection (e.g., using a terminal in contact with an EMV processor and/or other microchip). Data received may include an applet and/or applet data required to execute transactions, manipulate dynamic displays, and/or perform any of the functionality described herein.

Also, fully pre-loaded and/or partially pre-loaded data may also include keys (e.g., public/private key pairs, private key pairs, and/or the like) that may be used by circuitry associated with an EMV or similar chip to execute transactions using the EMV or similar chip processor on the card.

Figure 3:
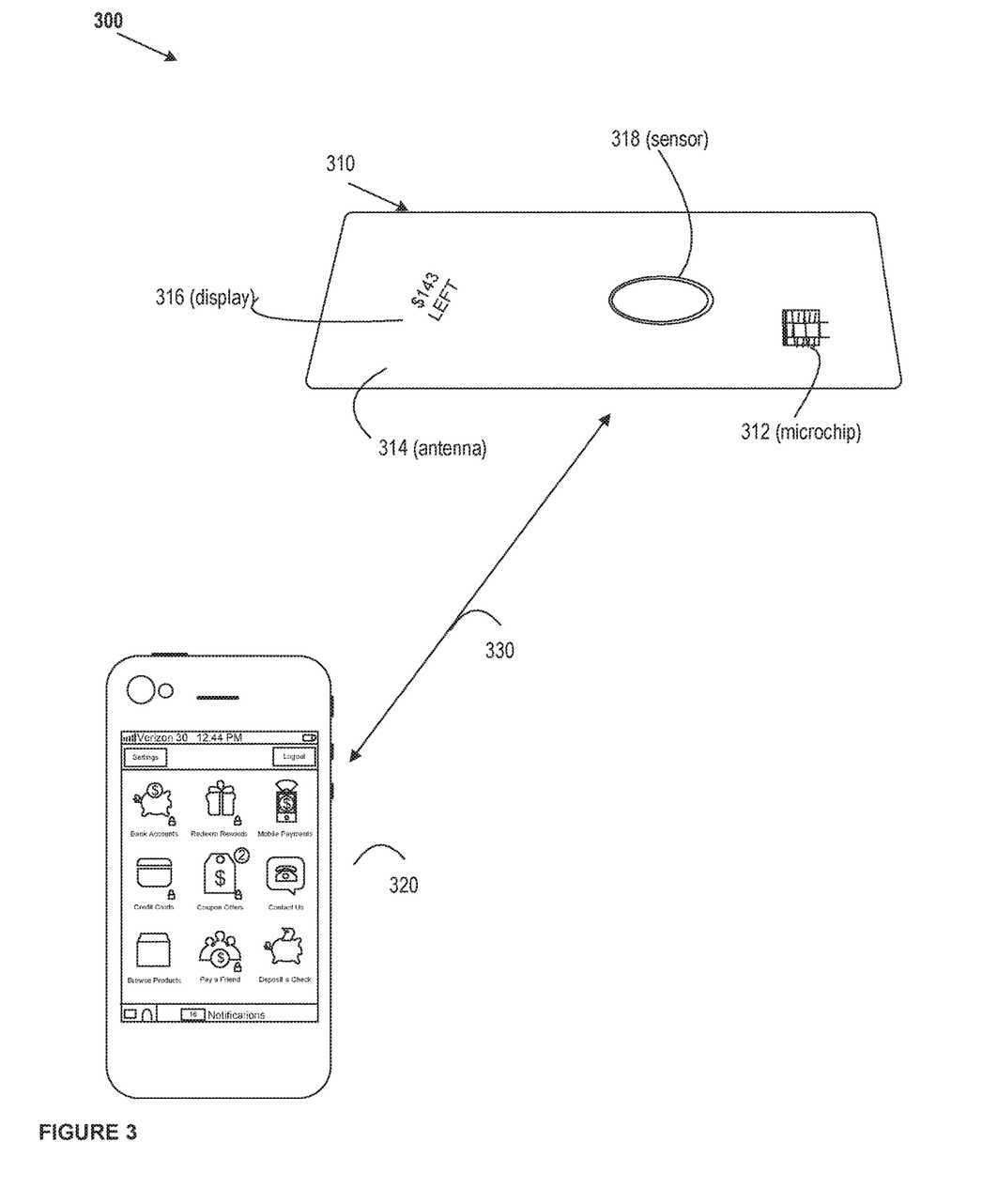
FIG. 3 depicts an example card-device linking system according to embodiments of the disclosure.

FIG. 3 illustrates a system associated with the use of a dynamic transaction card. The example system 300 in FIG. 3 may enable a mobile device 320 storing a mobile banking application, for example, to provide data updates to a dynamic transaction card 310 via network 330. For example, data received at mobile device 320 may be transmitted to dynamic transaction card 310 where it is received via antenna 314. Data may be received and/or transmitted using, for example a mobile banking application that maintains and/or creates a secure connection with a financial institution to send and/or receive data related to an account associated with the financial institution. For example, a mobile banking application may include send and/or receive data related to a credit account, a debit account, a prepaid account, a loyalty account, a rewards account, and/or the like. Data may also include track data that may be updated upon demand.

A mobile application may be paired with a dynamic transaction card to facilitate secure authentication and secure online checkout. The mobile application may notify a backend account provider system and/or data storage associated with the mobile application via an application programming interface (API) call to the backend to facilitate secure multi-factor authentication of a user by utilizing the dynamic transaction card as a physical token. The mobile application may communicate with a dynamic transaction card via a short-range wireless communication network, Bluetooth, BLE, and/or NFC, and may communicate with the backend account provider system via mobile networks or Wi-Fi.

Upon activation of dynamic transaction card via, for example, a sensor 318, a data request may be transmitted to a mobile device 320 for updated information, where mobile device 320 may request updated data from a financial institution (not shown). Data received at dynamic transaction card 310 may be stored on microchip 312 and/or may be displayed via display 316.

Figure 4:
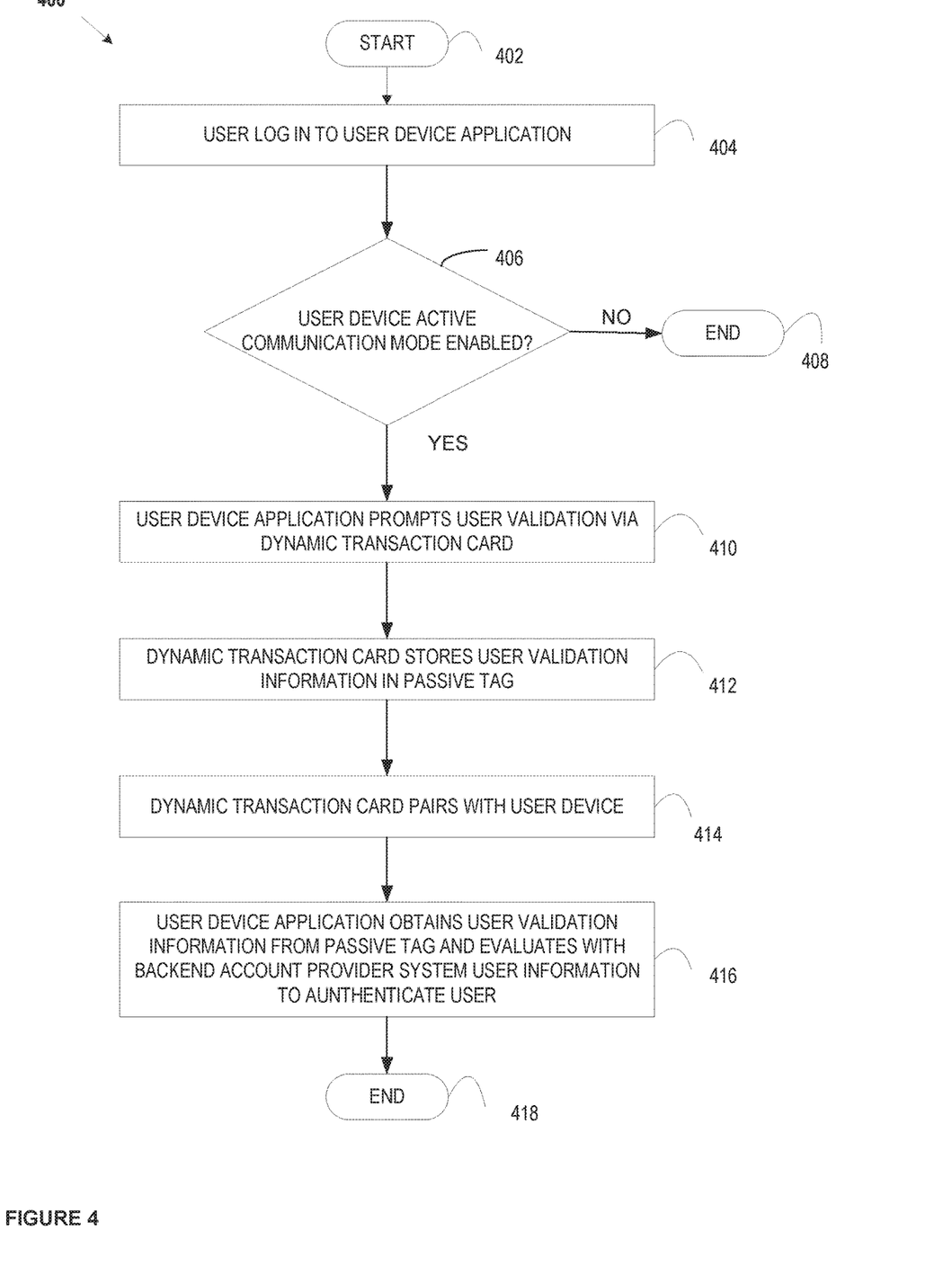
FIG. 4 depicts an example method for using a dynamic transaction card according to embodiments of the disclosure.

FIG. 4 illustrates an example method of utilizing a dynamic transaction card as a physical token to facilitate a secure method of multi-factor authentication of a dynamic transaction card and a user device. The method 400 may start at block 402. At block 404, a user may log in to a user device application executed on a user device. For example, a mobile application such as a mobile banking application may require a username and password in order for a customer to log in to a customer account.

User device application executed on a user device may enable an active communication mode on the user device. For example, an NFC connection may be utilized to pair a dynamic transaction card with a user device. In an embodiment, the system may enable Industry Standard NFC Transmission. For example, an NFC attachment, included on the dynamic transaction card, may enable two loop antennas to form an air-core transformer when placed near one another by using magnetic induction. The system may operate at 13.56 MHz or any other acceptable frequency. Also, the attachment may provide for a passive communication mode, where the initiator device provides a carrier field, permitting answers by the target device via modulation of existing fields. Additionally, the attachment may also provide for an active communication mode by allowing alternate field generation by the initiator and target devices.

As such, to utilize the dynamic transaction card to facilitate a secure multi-factor authentication, the active communication mode may be required to be enabled for the user device. The system may evaluate whether the active communication mode is enabled for the user device at block 406. If the active communication mode is not enabled on the user device, the process may end at block 408.

Based on the operating system of a user device, a user device application executed on the user device may have both an active communication mode and a passive/reader communication mode or may be limited to only having a passive/reader communication mode. In an additional embodiment, if a mobile device only has a passive reader mode, a short-range wireless connection, such as a Bluetooth or BLE connection, may be utilized as the connection between the dynamic transaction card and the user device application. As such, the system configuration described herein utilizing dynamic transaction cards in conjunction with a user device application transforms the user device application to an interoperable application that may be utilized across different operating systems, providing an operating system neutral mobile secure multi-factor authentication system.

Upon activation of the dynamic transaction card to wake up the card, a wireless connection, which may include a Bluetooth, BLE, or NFC connection may be established between the dynamic transaction card and the user device. For example, a dynamic transaction card may be placed within the range of a user device NFC antenna which may read user information stored on the dynamic transaction card, and may confirm the user's identity on the backend through the user device application by evaluating associated data stored in data storage associated with the dynamic transaction card and/or account provider system data storage. In another example, a user device may include a Bluetooth on BLE radio to read the user information associated with the dynamic transaction card.

A user may be prompted by a user device application executed on a user device to validate the user identity by utilizing a dynamic transaction card, which may provide a unique physical token for each user at block 410. At block 412, the application processor on the dynamic transaction card may be utilized to generate a passive tag, which may be utilized to securely store user account information in the passive tag. As such, sensitive user account information does not need to be entered to facilitate the multi-factor authentication and may be obtained through the connection between the dynamic transaction card and the user device. For example, if an NFC connection is utilized, the information may be obtained via an NFC antenna on the user device. A user may be issued a unique identifier stored on the dynamic transaction card's passive tag rather than storing personal information such as a customer name, zip code, email address, etc.

At block 414, the dynamic transaction card may receive a connection attempt from a user device application associated with the user device to pair the dynamic transaction card with the user device. Utilizing this connection, the user device application executed on the user device may obtain the user account information stored on the passive tag at block 416. The user may be authenticated by utilizing multi-factor authentication based on the pairing of the dynamic transaction card and the successful log in of the customer to the user device application. This multi-factor authentication may provide computer access control in which the user is only authenticated after successfully presenting these pieces of evidenced to an authentication system. For example, the user may be authenticated based on evaluation of the connection between the dynamic transaction card and the user device, log in credentials of the user for logging in to the user device application executed on the user device and user information stored in a digital security database. The introduction of the user device and dynamic transaction card may provide immutable hardware identifiers, processors for encryption and location awareness, as well as new interactions via touch, microphone, camera, Bluetooth, BLE, and/or NFC, as the user device and dynamic transaction card are something users typically have in their possession. The user device and dynamic transaction card may also enable transmission of data about users and data indicative of things users know. The digital security database may store information about a user that is enrolled in push notification authentication, including identifying characteristics of the dynamic transaction card, the user device and login information for the user for the user device application executed on the user device. Thus, systems and methods for authentication described herein provide a novel digital authentication framework that utilizes digital authentication techniques enabled by user devices and dynamic transaction cards.

The process may end at block 418.

In various example embodiments, push notification authentication may be utilized to facilitate the secure multi-factor authentication utilizing a dynamic transaction card and a user device. An account provider system may identify the user's identification and their registered device, which may include the user device and/or dynamic transaction card. The account provider system may also identify the user's login and the user's registered device. The account provider system servers may transmit a push notification to the user device and dynamic transaction card combination for the account. The customer may receive, for example, a slide up advising them the authentication request. The customer then may authenticate via the appropriate transaction level, swipe, password/touchID/pattern recognition or facial recognition and the customer application on the user device may transmit the customer's response—approve or deny—back to the card issuers server. If the customer receives this push notification, the customer may authenticate via the mobile device and/or dynamic transaction card as shown and described herein.

An application processor on the dynamic transaction card may also be utilized to generate a unique key, which may include a token, which may be utilized to securely store user validation information, which in turn may be utilized to authenticate the user. As such, sensitive user information does not need to be entered to facilitate the multi-factor authentication and may be obtained through the wireless connection. The unique key may be associated with the user device application user login and may include a single-use transaction key.

The request facilitates a secure multi-factor authentication may be processed using the systems described in FIGS. 1, 2, 3. Data may be securely transmitted between a user device, a dynamic transaction card, a financial institution, and a merchant. Moreover, a mobile banking application and/or a financial institution application may provide a secure connection and/or security features (e.g., cryptographic keys, protocol, hash algorithm, digital signatures, passwords, checksums, and/or the like) to conduct secure communications with a financial institution and merchant backend and receive updated financial data to transmit, via RFID, BLE, Bluetooth, NFC, and/or the like, to a dynamic transaction card for storage and/or display.

For example, a mobile application may communicate with a backend account provider and/or merchant system via a mobile network or Wi-Fi to pass user/account information to the backend. User account information may be encrypted to facilitate a secure transfer of the information. The transmitted information may include a key or token of encrypted information representing a financial account, the amount of the transaction and/or other information necessary to facilitate the multi-factor authentication. The backend account provider system may verify the user account information, as it may use the user account information to look up the account of the user and determine whether a user should be authenticated, and my also relatedly by utilized to determine whether an associated transaction should be authorized. The account provider system may check the account information against certain parameters to determine, for example, whether the authentication request complies with certain parameters, and/or whether the associated token has expired.

An API may also encrypt, for example account and routing numbers to ensure that any passing user account identifying data is secure during transmission and storage. The data may be read and encrypted using a private key stored within the dynamic transaction card processor. A user device also may store instructions to encrypt and/or encode data being transmitted from the user device. A user device may store instructions to decrypt and/or decode data received at the user device. A user device may store encryption/encoding/decryption/decoding instruction in a secure element or a secure microprocessor. For example, where a user device includes a secure payment chip, which may be an EMV chip, encryptions/encoding/decryption/decoding instructions may be stored within the secure payment chip, which may be an EMV chip. A user device may store instructions to validate a public/private key handshake between the user device and a dynamic transaction card to pair the user device and dynamic transaction card device via a Bluetooth/BLE connection.

In another embodiment, the user device may include a personal computer and the associated user device application may include a desktop application. To facilitate the multi-factor authentication described herein, the dynamic transaction card may be connected to an external portable connection device, for example a Universal Serial Bus (USB) dongle. To facilitate the user authentication processing described herein, the dynamic transaction card connected to the portable connection device may be inserted into the associated user device.

In another embodiment, to facilitate the multi-factor authentication described herein, the dynamic transaction card may be inserted into a magnetic stripe reader, which may be any electronic data input device that reads data from a magnetic stripe on a credit or debit card, for example. The magnetic stripe reader may include a magnetic reading head capable of reading information from a magnetic stripe. For example, the magnetic stripe reader may be capable of reading, for example, cardholder information from tracks 1, 2, and 3 on magnetic cards. In various embodiments, track 1 may be written on a card with code known as DEC SIXBIT plus odd parity and the information on track 1 may be contained in several formats (e.g., format A, which may be reserved for proprietary use of the card issuer; format B; format C-M which may be reserved for us by ANSI subcommittee X3B10; and format N-Z, which may be available for use by individual card issuers). In various embodiments, track 2 may be written with a 5-bit scheme (4 data bits plus 1 parity). Track 3 may be unused on the magnetic stripe. In various embodiments, track 3 transmission channels may be used for transmitting dynamic data packet information to further enable enhanced token-based payments. The magnetic strip reader may read user information stored on the dynamic transaction card and may confirm the user's identity on the backend by evaluating associated data stored in data storage associated with the dynamic transaction card and/or account provider system data storage.

The dynamic transaction card may also be inserted into a smart payment terminal, such as those provided by Square®, Poynt®, and Clover® to facilitate the multi-factor authentication described herein. The smart payment terminal may read user information stored on the dynamic transaction card and may confirm the user's identity on the backend by evaluating associated data stored in data storage.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, processors, etc.) separately. The functions described as being performed at various components may be performed at other components, and the various components bay be combined or separated. Other modifications also may be made.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It may be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It may be further understood by those within the art that if a specific number of an introduced claim recitation is intended, such an intent may be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It may be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" may be understood to include the possibilities of "A" or "B" or "A and B."

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise, various steps may be omitted, repeated, or combined, as necessary, to achieve the same or similar objectives. Accordingly, the invention is not limited to the above-described embodiments, but instead is defined by the appended claims in light of their full scope of equivalents.

In the preceding specification, various preferred embodiments have been described with references to the accompanying drawings. It may, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

What is claimed is:

1. A dynamic transaction card, comprising:
an outer surface;
a sensor comprising a first material to enable the outer surface to act as the sensor;
a display disposed on the outer surface and in communication with the sensor, the display comprising a plurality of light-emitting diodes (LEDs);
a secure payment chip comprising a plurality of contact points accessible from the outer surface;
a passive tag stored in the secure payment chip, the passive tag comprising:
a unique identifier associated with a user; and
one or more log-in credentials for the user;
an antenna; and
a microcontroller controlling a dynamic transaction card application, wherein the application causes the dynamic transaction card to:
receive, at the antenna, a request from a user device to authenticate the user of the user device, wherein the user has logged in to the user device using the one or more log-in credentials;
create, with the antenna, a wireless connection between the dynamic transaction card and the user device;
evaluate, with the sensor, the wireless connection between the dynamic transaction card and the user device,
display, on the display, an alert indicative of the wireless connection;
compare, with the microcontroller, the one or more log-in credentials received from the user device to the one or more log-in credentials stored in the passive tag; and
transmit, with the antenna, the unique identifier to the user device.

2. The dynamic transaction card of claim 1, wherein the passive tag further comprises a preloaded encryption key configured to encrypt data.

3. The dynamic transaction card of claim 1, wherein the application further causes the dynamic transaction card to:
receive data from a transaction system for a user purchase; and
transmit, to the transaction system, a user identification and the one or more log-in credentials;
wherein the unique identifier associated with the user is used to complete the user purchase.

4. The dynamic transaction card of claim 1, wherein the sensor includes one or more of: a capacitive touch sensor or a piezoelectric sensor.

5. A dynamic transaction card, comprising:
a microcontroller;
a passive tag comprising:
a unique identifier associated with a user; and
one or more log-in credentials for the user;
a secure payment chip storing the passive tag;
an antenna in communication with the secure payment chip; and
a dynamic transaction card application that, when executed, causes the dynamic transaction card to:

receive, at the antenna, a request from a user device to authenticate the user of the user device, wherein the user has logged in to the user device using the one or more log-in credentials;

create, with the antenna, a wireless connection between the dynamic transaction card and the user device;

compare, at the microcontroller, the one or more log-in credentials received from the user device to the one or more log-in credentials in the passive tag; and transmit, from the antenna, the unique identifier associated with the user to the user device.

6. The dynamic transaction card of claim 5, further comprising:

a sensor configured to evaluate the wireless connection between the dynamic transaction card and the user device.

7. The dynamic transaction card of claim 5, wherein the dynamic transaction card application further causes the dynamic transaction card to:

receive, at the antenna, data associated with a user purchase on the user device, wherein the unique identifier associated with the user is used to complete the user purchase.

8. The dynamic transaction card of claim 5, wherein the passive tag further comprises:

log-in information for the user and characteristics of the dynamic transaction card and the user device.

9. The dynamic transaction card of claim 5, wherein the passive tag further comprises a preloaded encryption key configured to encrypt data.

10. The dynamic transaction card of claim 5, further comprising:

a dynamic display comprising one or more light-emitting diodes (LEDs), the dynamic display configured to display data received by the antenna.

11. The dynamic transaction card of claim 10, wherein the dynamic transaction card application further causes the dynamic transaction card to:

display an alert responsive to receiving the request, wherein the alert is indicative of a wireless connection being created between the user device and the dynamic transaction card.

12. The dynamic transaction card of claim 5, wherein the dynamic transaction card application further causes the dynamic transaction card to:

receive, from a transaction system, data for a user purchase; and transmit, to the transaction system, a user identification and the one or more log-in credentials;

wherein the unique identifier associated with the user is used to complete the user purchase.

13. A dynamic transaction card, comprising:

a microcontroller; and an application processor storing instructions that, when executed by the microcontroller, cause the dynamic transaction card to:

receive a request from a user device to authenticate a user of the user device, the user logged in to the user device using one or more log-in credentials;

create a wireless connection between the dynamic transaction card and the user device;

compare the one or more log-in credentials to one or more stored log-in credentials in a passive tag, the passive tag comprising a unique identifier associated with the user and the one or more stored log-in credentials for the user, wherein the one or more stored log-in credentials are obtained from an account provider system; and transmit the unique identifier associated with the user to the user device.

14. The dynamic transaction card of claim 13, wherein the instructions further cause the dynamic transaction card to:

evaluate, with a sensor, the wireless connection between the dynamic transaction card and the user device.

15. The dynamic transaction card of claim 13, wherein the instructions further cause the dynamic transaction card to:

receive data from the user device indicative of a user purchase, wherein the unique identifier associated with the user is used to complete the user purchase.

16. The dynamic transaction card of claim 13, wherein the passive tag further comprises:

log-in information for the user and characteristics of the dynamic transaction card and the user device.

17. The dynamic transaction card of claim 13, wherein the passive tag further comprises a preloaded encryption key configured to encrypt data.

18. The dynamic transaction card of claim 13, further comprising:

a dynamic display comprising one or more light-emitting diodes (LEDs), the dynamic display configured to display data received by an antenna of the dynamic transaction card.

19. The dynamic transaction card of claim 18, wherein:

the display is further configured to display an alert responsive to receiving the request; and the alert is indicative of a wireless connection being created to the user device.

20. The dynamic transaction card of claim 13, wherein the instructions further cause the dynamic transaction card to:

receive data from a transaction system for a user purchase; and transmit, to the transaction system, a user identification and the one or more log-in credentials;

wherein the unique identifier associated with the user is used to complete the user purchase.

* * * * *